(12) United States Patent
Agnese et al.

(10) Patent No.: US 6,985,116 B2
(45) Date of Patent: Jan. 10, 2006

(54) BOLOMETRIC DETECTION DEVICE WITH ANTENNA AND OPTIMIZED CAVITY FOR MILLIMETRIC OR SUB-MILLIMETRIC ELECTROMAGNETIC WAVES, AND MANUFACTURING PROCESS FOR THIS DEVICE

(75) Inventors: Patrick Agnese, Grenoble (FR); Patrice Rey, Saint-Jean de Moirans (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/839,129

(22) Filed: May 6, 2004

(65) Prior Publication Data

US 2004/0252065 A1    Dec. 16, 2004

(30) Foreign Application Priority Data

May 26, 2003  (FR) .................................. 03 50176

(51) Int. Cl.
*G01R 1/00*        (2006.01)
(52) U.S. Cl. .............................. 343/703; 343/700 MS; 250/338.1
(58) Field of Classification Search ................ 343/703, 343/700 MS, 878
See application file for complete search history.

(56) References Cited

U.S. PATENT DOCUMENTS

| | | | |
|---|---|---|---|
| 5,397,897 A * | 3/1995 | Komatsu et al. ......... | 250/338.4 |
| 5,404,125 A * | 4/1995 | Mori et al. .................... | 338/18 |
| 5,672,903 A * | 9/1997 | Butler et al. ................. | 257/467 |
| 5,825,029 A | 10/1998 | Agnese et al. ........... | 250/338.1 |
| 5,912,464 A | 6/1999 | Vilain et al. ............. | 250/338.4 |
| 6,229,144 B1 | 5/2001 | Ouvrier-Buffet et al. | 250/338.4 |
| 6,292,140 B1 * | 9/2001 | Osterman ............ | 343/700 MS |
| 6,300,554 B1 * | 10/2001 | Du et al. ..................... | 136/201 |
| 6,316,770 B1 | 11/2001 | Ouvrier-Buffet et al. | 250/338.1 |
| 6,326,621 B1 * | 12/2001 | Kamada et al. .......... | 250/338.2 |
| 6,329,655 B1 | 12/2001 | Jack et al. ............... | 250/338.1 |
| 6,426,539 B1 | 7/2002 | Vilain et al. ................ | 257/425 |
| 2003/0222217 A1 * | 12/2003 | Luukanen ................ | 250/336.2 |

FOREIGN PATENT DOCUMENTS

| EP | 0 749 007 | 12/1996 |
|---|---|---|
| WO | WO 00/40937 | 7/2000 |

* cited by examiner

*Primary Examiner*—Shih-Chao Chen
(74) *Attorney, Agent, or Firm*—Oblon, Spivak, McClelland, Maier & Neustadt, P.C.

(57) ABSTRACT

Bolometric detection device with antenna and optimized cavity for millimetric or sub-millimetric electromagnetic waves, and manufacturing process for this device. This device, preferably made from a double type substrate, is applicable particularly in astrophysics and comprises at least one bolometer comprising an antenna (22), a resistive load (26), a thermometric element (24) and a resonant cavity (28), surrounded by a material with optical index n. The thickness of the cavity is less than $\lambda/(4n)$, where $\lambda$ is the average wavelength of the waves to be detected.

8 Claims, 7 Drawing Sheets under the field of the invention.

BOLOMETRIC DETECTION DEVICE WITH ANTENNA AND OPTIMIZED CAVITY FOR MILLIMETRIC OR SUB-MILLIMETRIC ELECTROMAGNETIC WAVES, AND MANUFACTURING PROCESS FOR THIS DEVICE

TECHNICAL DOMAIN

This invention relates to a bolometric detection device with antenna for millimetric or sub-millimetric electromagnetic waves, and a process for manufacturing this device.

The invention relates particularly to a matrix of bolometers with antennas for adaptation to absorption of millimetric or sub-millimetric electromagnetic waves.

The invention is thus related to the domain of passive bolometric detection in the spectral range varying from sub-millimetric wavelengths to millimetric wavelengths.

Within this spectral range, there are several atmospheric transmission windows that can be used to obtain images for scientific, civil or military applications, particularly due to matrices of bolometers.

Bolometers measure the power of incident radiation: these are quadratic detectors. In a bolometer, an absorbent element converts an incident light flux into a heat flux, which increases the temperature of a sensitive element compared with a reference temperature. A thermometric sensor converts these temperature variations into electrical signals.

Although a bolometer is theoretically a sensitive detector over a very wide spectral band, the different existing absorption systems are optimized for a given restricted band.

Note immediately that this invention relates to a system which makes it possible to design matrices of bolometers that can easily be adapted to different spectral bands within the domain of the invention and provide a significant improvement in terms of photometric performances.

STATE OF PRIOR ART

We will now consider detection in the broad spectral domain corresponding to sub-millimetric wavelengths (of the order of 100 μm) and millimetric wavelengths (a few millimeters).

At the present time, the sub-millimetric domain concerns applications for either spatial or airborne astrophysical observations, or astrophysical observations made by telescopes placed on the ground.

The millimetric domain concerns both astrophysical observation applications and military and civil applications.

For astrophysical observations, detection requires very high performances in terms of detectable noise equivalent power, this power being located within the $10^{-17}$ to $10^{-15}$ W/Hz$^{1/2}$ range. Detectors cooled to a very low temperature (of the order of 0.3 K for bolometers) are necessary to obtain these performances.

For ground or airborne observation, detection for military or civil applications requires NEP (noise equivalent powers) within the range $10^{-14}$ to $10^{-12}$ W/Hz$^{1/2}$, but within a detector temperature range varying from 150 to 300 K, particularly for operational and cost reasons.

Therefore, a distinction is made between two millimetric detection contexts, namely highly cooled detectors and detectors at "ambient" temperatures.

In both of these contexts, we will pay more attention to matrix detectors composed of rows and columns of elementary detectors that perform fast imagery, compared with a mono-detector system with scanning in two dimensions.

Note that the invention does not relate to grid bolometers such as those described in the following document:

[1] EP 0 749 007 A corresponding to U.S. Pat. No. 5,825,029 A (Patrick Agnèse and Jean-Michel Sajer).

The invention is limited to bolometers with antennas, which are described in the following documents:

[2] WO 00/40937 A "Bolometric detector with antenna" Patrick Agnèse).

[3] U.S. Pat. No. 6,329,655 B, "Architecture and method of coupling electromagnetic energy to thermal detectors" (Michael D. Jack et al.).

FIG. 1 is a diagrammatic sectional view of a known example of millimetric bolometer with antenna.

This type of bolometer comprises a substrate 2 that is metallized and a detection part 4 that is etched, as can be seen in FIG. 1. This detection part comprises an antenna 6 and a central thermometer 8 that is fixed to the antenna 6 through beams or arms 10 made of a resistive metal.

In this bolometer, a resonant cavity 12 consisting of a quarter-wave cavity is formed by embedding the substrate 2 in the detection part 4. This cavity 12 is made reflecting by metallization 14 of the substrate.

The thickness or height e of the cavity 12 that is equal to the distance between the antenna 6 and the metallization 14 is adapted to detection of a radiation with determined wavelength λ; it is equal to λ/(4n), where n is the optical index of the material used to make the detection part 4 that delimits the cavity 12. In the example in FIG. 1, this material is silicon.

The disadvantage of such a structure is that the cavity located under the antenna is delimited by silicon that has a relatively high optical index. Therefore, the spectral absorption takes place within a narrow range of wavelengths.

Moreover, the value of the resistance of the electrical antenna load, consisting of the suspension arms of the central thermometer, is too limited to obtain a maximum absorption of the incident radiation flux.

Consequently, since this load also forms the thermal resistance of the bolometer, the response of this bolometer has a relatively low value.

We will examine the disadvantages of a known bolometer with antenna more precisely.

This type of bolometer comprises a cavity under its antenna in order to improve its response in absorption. Conventionally, the thickness of this cavity is equal to one quarter of the average wavelength of radiation to be detected.

Therefore, this cavity is adapted to a given wavelength. In this way, signals that are directly absorbed and signals that passed through the cavity are added at the output and increase the total absorption.

Furthermore, if a medium has an optical index n, the load resistance R of this medium is equal to $Z_0/n$, where $Z_0$ is the impedance of a vacuum that is equal to 377 Ω. In the case of a quarter wave cavity with an optical index n and a thickness λ/4n, where λ is the average wavelength of radiation to be detected, the load resistance becomes $R=Z_0/n$.

Therefore the load resistance R may be equal to not more than $Z_0$ if the material is a vacuum, knowing that it is very difficult to create a vacuum since antennas are rarely self-supporting.

PRESENTATION OF THE INVENTION

This invention is intended to increase the performances of known bolometers with antennas, and more particularly to improve the load resistance of such bolometers, so as to obtain a low thermal conductance without correspondingly degrading the radiation absorption by these bolometers.

One solution would consist of finding a sub-antenna material for which the optical index is less than 1, but this is impossible. Therefore, a means must be found such that the "apparent" index (seen by the incident wave) is less than 1. This is achieved according to the invention by using a thinner cavity, rather than a quarter wave cavity.

Under these conditions, the radiation absorbed directly and the radiation retransmitted by the cavity are no longer added simply.

But another phenomenon then arises such that absorption is surprisingly increased.

This absorption is measured by simulations that use Maxwell equations.

Note that the invention forms, in particular, an improvement to the bolometric detector with antenna described in document [2].

Precisely, this invention relates to a bolometric detection device for millimetric or sub-millimetric electromagnetic waves, this device comprising at least one bolometer comprising a receiving antenna, a resistive load, a thermometric element and a resonant cavity surrounded by a part of the bolometer, this part consisting of a material with an optical index n, the receiving antenna being located above the resonant cavity, this device being characterized in that the thickness of the resonant cavity is strictly less than $\lambda/(4n)$, where $\lambda$ is the average wavelength of electromagnetic waves that will be detected by the device.

According to one preferred embodiment of the device according to the invention, the bolometer also comprises a detection part, that comprises the receiving antenna and the thermometric element, and a reflecting substrate embedded in this detection part, the resonant cavity being delimited by this reflecting substrate and this detection part.

For example, the receiving antenna may be a quadrupole antenna.

The bolometer may be of the cooled type, or on the contrary, of the uncooled type.

The device according to the invention preferably comprises a matrix of M×N bolometers, where M and N are integers equal to at least 1.

This invention also relates to a process for manufacturing the device according to the invention, in which the bolometer comprising the receiving antenna, the resistive load, the thermometric element and the resonant cavity is formed from a substrate comprising a bulk silicon/silica/thin silicon layer structure.

According to one preferred embodiment of the process according to the invention, this substrate comprises a bulk silicon/silica/thin silicon layer/silica/thin silicon layer structure.

BRIEF DESCRIPTION OF THE DRAWINGS

This invention will be better understood after reading the description of example embodiments given below for guidance only, and that are in no way limitative, with reference to the appended drawings among which.

DETAILED PRESENTATION OF PARTICULAR EMBODIMENTS

In one example, the bolometric device according to the invention comprises a quadrupole receiving antenna for which the topology, the resonant cavity and the resistive load are all three optimized.

For example, a central optical detection frequency f equal to 94 GHz is targeted with a band width equal to at least 40 GHz, without polarization selectivity and using an antenna for which the pitch is equal to $\lambda/2=1.6$ mm, where $\lambda$ is the central wavelength corresponding to the frequency f.

Optimization of such a bolometer with antenna involves an increase in the antenna load, or resistive load, since the thermal response then increases.

The antenna structure and its subjacent resonant cavity need to be adapted so as to be able to increase this load without correspondingly degrading the optical response or the corresponding spectral absorption curve.

Simulations of the electromagnetic behavior of the device fitted with the quadrupole antenna were made.

Figure 1:
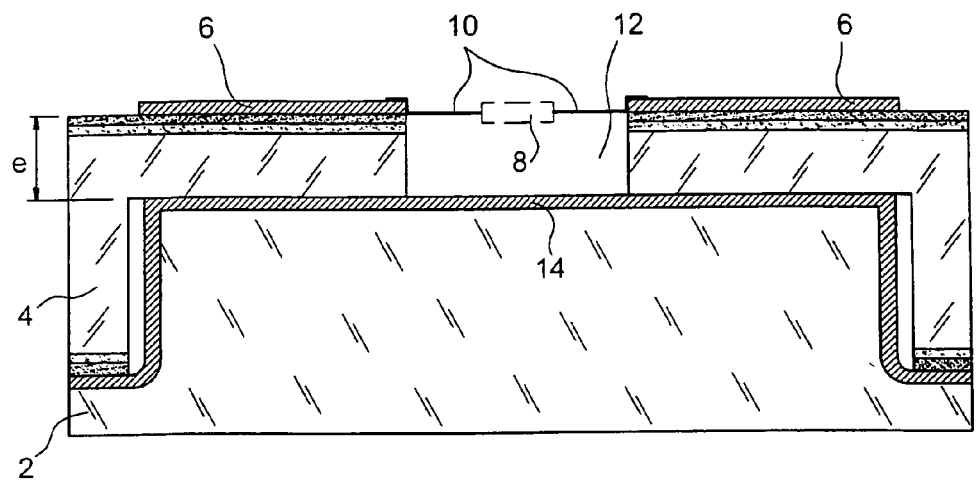
FIG. 1 is a diagrammatic section of a known bolometer with antenna and has already been described.
Figure 2:
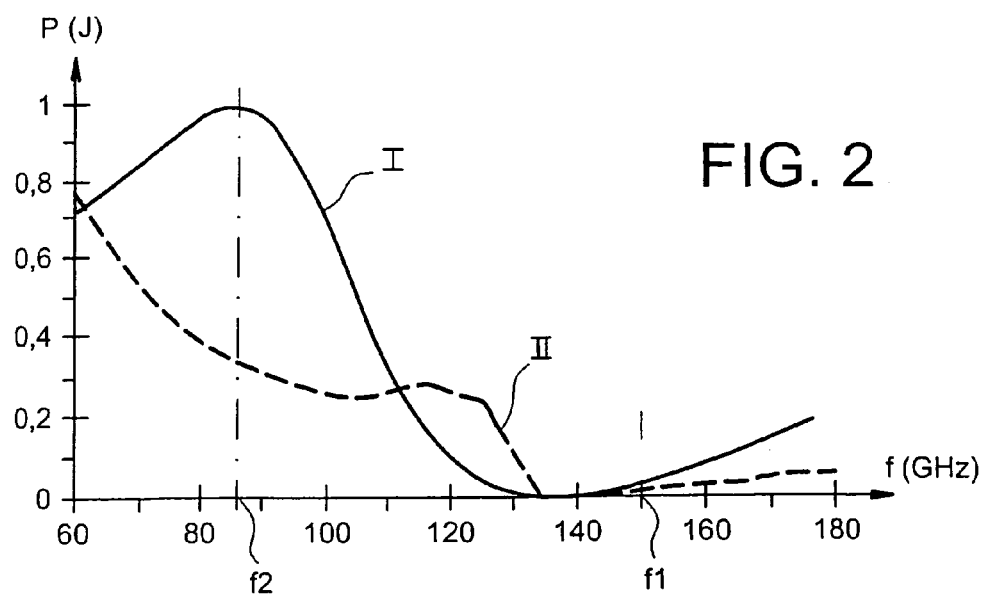
FIGS. 2 and 3 are curves showing the results of the simulation of the electromagnetic behavior of bolometers with antenna.

In a first simulation, the pitch of this antenna is equal to 1.6 mm and a 0.5 mm thick vacuum resonant cavity is used. Resulting variations of the absorption power P (in joules) as a function of the frequency f (in GHz) are plotted in FIG. 2 for a resistive load of 200 Ω (curve I) and for a resistive load of 1500 Ω (curve II).

For a load of 200 Ω, the "quarter wave" effect that was expected at $\lambda=2$ mm corresponding to $f_1=150$ GHz is not observed (the maximum wavelength $\lambda_{max}$ for e=0.5 mm is equal to 4×e=2 mm): the maximum is reached at $\lambda=3.5$ mm which corresponds to $f_2=86$ GHz.

Therefore, the quarter wave cavity does not have a predominant effect: there is another resonant effect, namely a surface wave excitation.

Moreover, it is seen that the 86 GHz peak drops when the load resistance changes from 200 Ω to 1500 Ω, which is not interesting since this load is to be increased.

Figure 3:
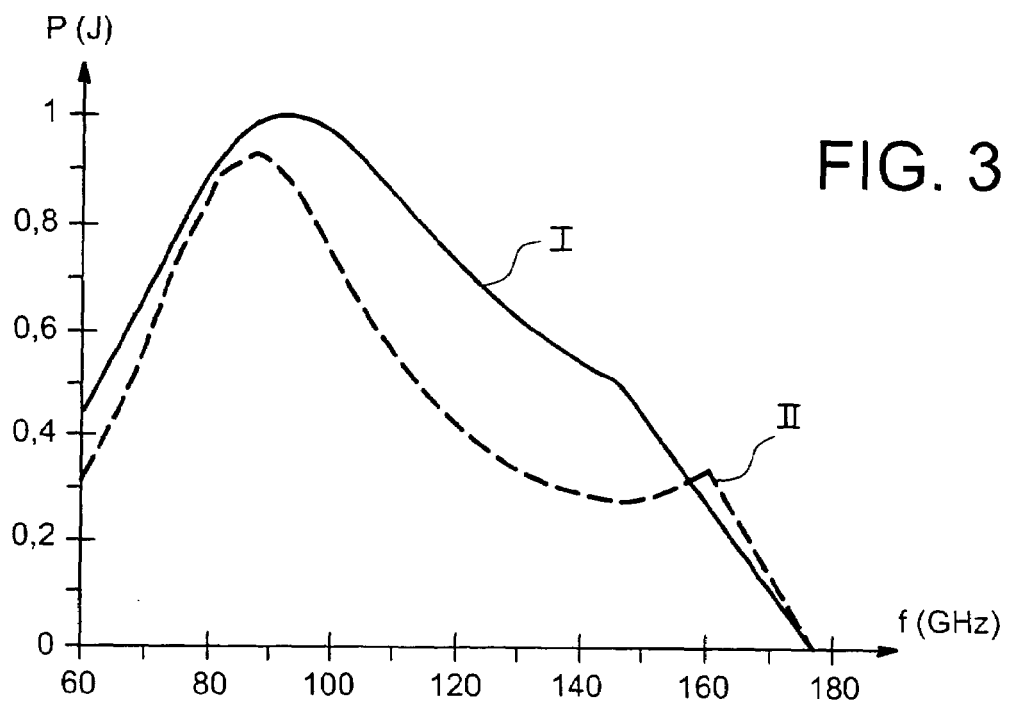

In a second simulation, the thickness of the cavity is thinner; it is equal to 0.2 mm; the antenna once again has the quadrupole structure, but with a pitch of 1.28 mm. The results of this simulation are shown in FIG. 3, for a load of 750 Ω (curve I) and for a load of 1500 Ω (curve II).

Therefore, it can be seen that the maximum absorption continues to be obtained at about 90 GHz with a 0.2 mm thick cavity but in this case, for several values of the load resistance and particularly for higher values. Therefore, it is beneficial to reduce the thickness of the cavity.

Returning to the second simulation, a first compromise is found for a pitch of 1.3 mm, a 0.2 mm thick cavity and a 1500 Ω load, resulting in an increase by a factor of 7.5 compared with the case of the first simulation.

In a preferred embodiment of this invention, the difficulty in making an empty cavity, for example with a thickness of 200 μm, by minimizing the thickness of silicon under the antenna, is overcome if a double SOI type substrate, also called a "DSOI substrate" (bulk silicon/silica/thin silicon layer (usually a few micrometers thick)/silica/thin silicon layer) is used instead of using an SOI type substrate (bulk silicon/silica/thin silicon layer).

Thus, the silicon thickness is controlled independently of the dispersion of deep etching through the back face of the substrate, under a millimetric size antenna, so as to guarantee planeness of this antenna and to avoid the "pleated sheet" effect resulting from stresses in the metallic layer used for formation of the antenna.

Figure 4:
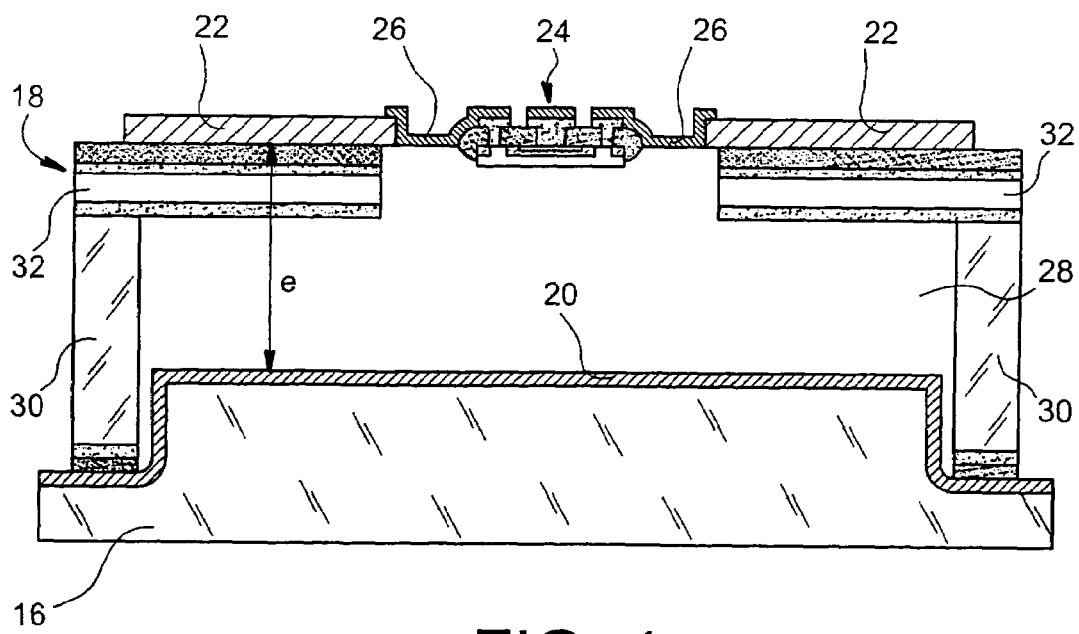
FIG. 4 is a diagrammatic sectional view of an example of a bolometric device according to the invention, FIGS. 5A to 5L diagrammatically illustrate steps in an example of a manufacturing process according to the invention, and FIG. 6 diagrammatically illustrates a matrix bolometric device according to the invention.

Thus, the result is an example of a bolometer according to the invention, which is shown diagrammatically in section in FIG. 4.

We will describe an example process according to the invention in the following, to obtain the bolometer in FIG. 4; this figure corresponds to FIG. 5L that shows the results of the steps illustrated by FIGS. 5A to 5K.

The bolometer in FIG. 4 comprises a substrate 16 made of silicon and a detection part 18 formed from silicon. The substrate 16 is embedded in this part 18 through the back face of the part.

The surface of this substrate 16 facing the detection part 18, is coated with an electrically conducting thin layer 20 forming a reflector.

The detection part 18 comprises an antenna 22, for example a quadrupole type antenna, and a central thermometer 24 suspended from the antenna by beams 26 made from a resistive metal.

The bolometer in FIG. 4 also comprises a resonant cavity 28 that is empty and is composed of the space between the detection part 18 and the reflector 20. The antenna 22 is located above this cavity 28.

The thickness e of this cavity is the distance between the antenna 22 and the reflector 20. According to the invention, this thickness e is strictly less than $\lambda/(4n)$, where $\lambda$ is the average wavelength of the radiation to be detected with the bolometer and n is the optical index of the material that delimits the cavity (in this case the silicon in the detection part).

Typically, the detection part 18 comprises a first silicon layer 30 a few micrometers thick, which guarantees the mechanical behavior of the antenna on the subjacent vacuum cavity, the height of which is adjustable due to the reflecting substrate 16 that is mobile.

The detection part also comprises a second silicon layer 32 a few tenths of a micrometer thick used for making the thermometer 18. The thermometer is suspended from beams 26 made of a resistive metal, for example TiN or TaN.

This type of structure solves the problems mentioned above. For millimetric bolometers at ambient temperatures, an empty cavity was actually formed based on the simulation described above, and a significant increase in the resistive load and therefore the thermal resistance of the bolometer were obtained.

For sub-millimetric bolometers at temperatures less than 1 K, the calorific mass was effectively minimized, in other words to the calorific mass of the thermometer since the wave detection function (antenna) and the bolometric function (in other words the thermometer and beams function) are now topologically dissociated, unlike the technique disclosed in document [1].

The metal that forms the suspension beams 26 becomes superconducting below a few degrees Kelvin. Therefore, the beams have a very high thermal resistance at a few tenths of one degree Kelvin.

Nevertheless, this metal remains resistive at the high frequency of an incident electromagnetic wave. Therefore, surface electric currents induced by the wave on the antenna are dissipated by the Joule effect in the resistive load consisting of these beams, which increases the temperature of the thermometer.

With reference to FIGS. 5A to 5L, we will now explain an example of the manufacturing process according to the invention in order to obtain the bolometer in FIG. 4. In order to manufacture this bolometer, a substrate 34 (FIG. 5A) is used that forms a DSOI substrate.

This substrate 34 is thus a stack composed of:
- a bulk silicon substrate 36, for example 450 µm thick,
- a buried thin layer of silica 38, for which the thickness is for example equal to 380 nm,
- a thin layer of epitaxied silicon 40, for which the thickness is for example equal to 5 µm,
- another buried thin layer of silica 42, for which the thickness is for example equal to 380 nm, and
- another thin layer of epitaxied silicon 44, for which the thickness is for example 1 µm.

We will now make ionic implantations in the upper layer 44 (FIG. 5B), namely:
- a first ionic implantation of p++ doped silicon (reference 46 in FIG. 5B) to define three silicon zones in the layer 44, with the references 48, 50 and 52, and
- a second ionic implantation to form an n++ doped silicon zone 54 in the central zone 52, for example 500 nanometers thick.

Figure 5A:
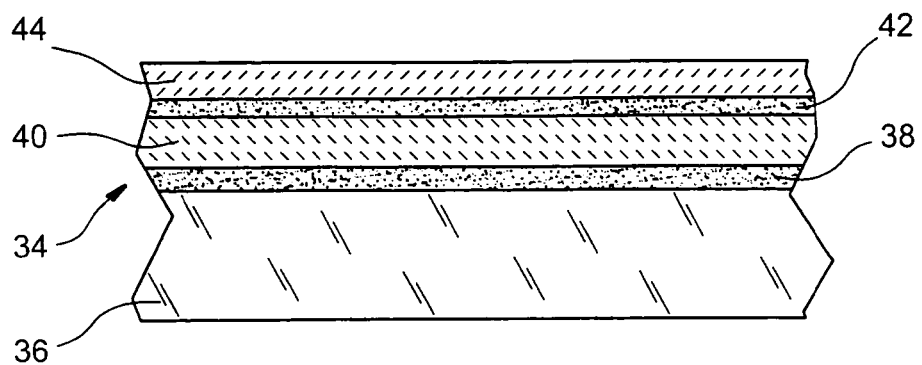
Figure 5B:
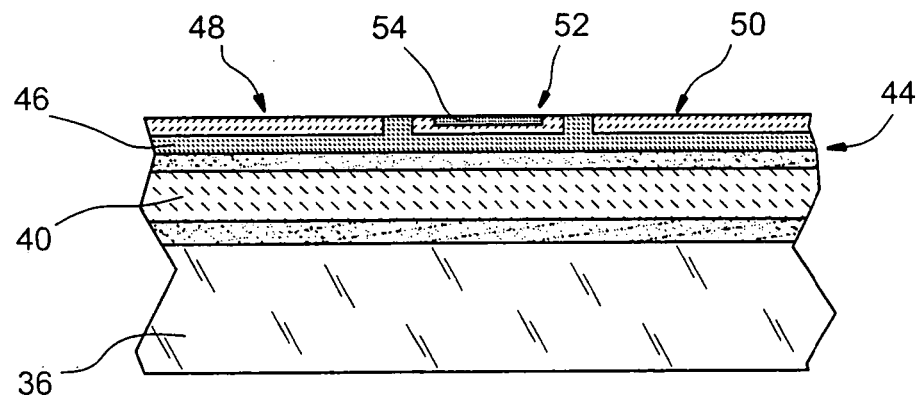
Figure 5C:
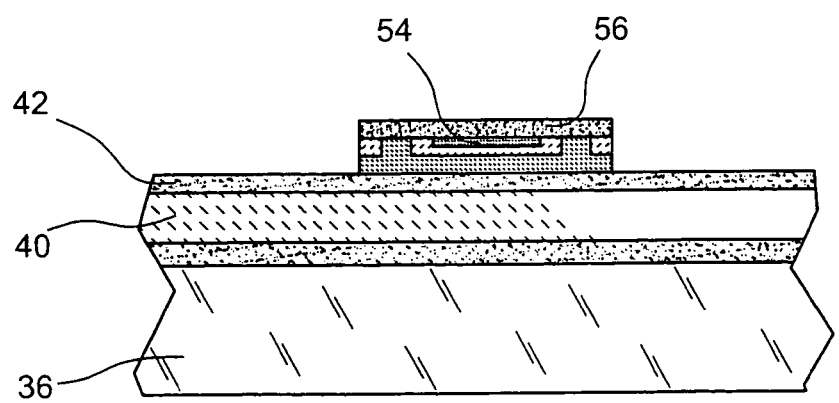

Then, photolithography and mesa etching are used to eliminate the most of the silicon in zones 48 and 50 and the p++ doped subjacent silicon in these zones to essentially leave zone 52 as seen in FIG. 5C.

In this figure, the next step is to deposit a very thin layer 56 of photosensitive resin, for example a 7 µm thick layer of 5740 resin.

Figure 5D:
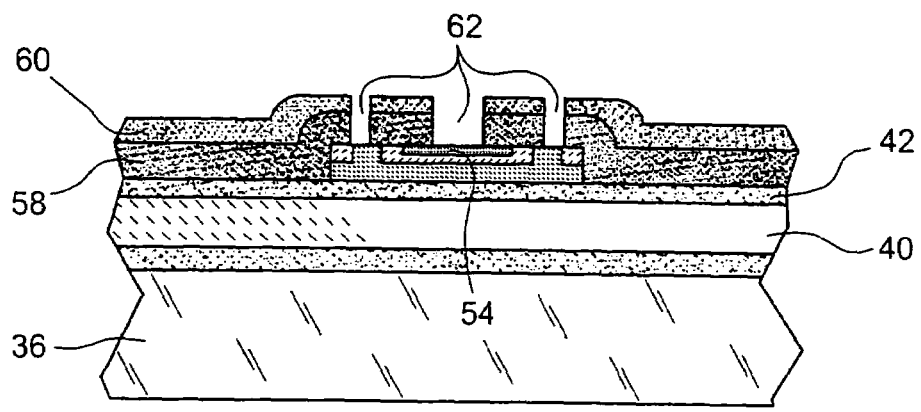

Then as shown on FIG. 5D, the next step is photolithographies and contact etching.

After eliminating the resin layer 56, the next step is to deposit a silica layer 58 (for example 1 µm thick) on the resulting structure and then a photosensitive resin layer 60 on this layer 58, for example a 7 µm thick layer of 5740 resin (Shipley Company).

The next step is to form openings 62 like those shown in FIG. 5D, through the layers 58 and 60.

Figure 5E:
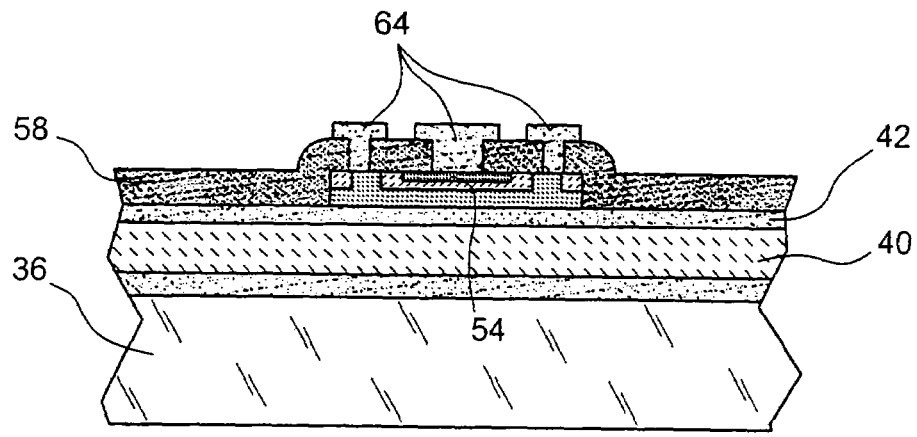

Then, as shown in FIG. 5E, the next step is to form electric contacts 64 made of AlSi through these openings 62, over a thickness equal to 150 nm.

Figure 5F:
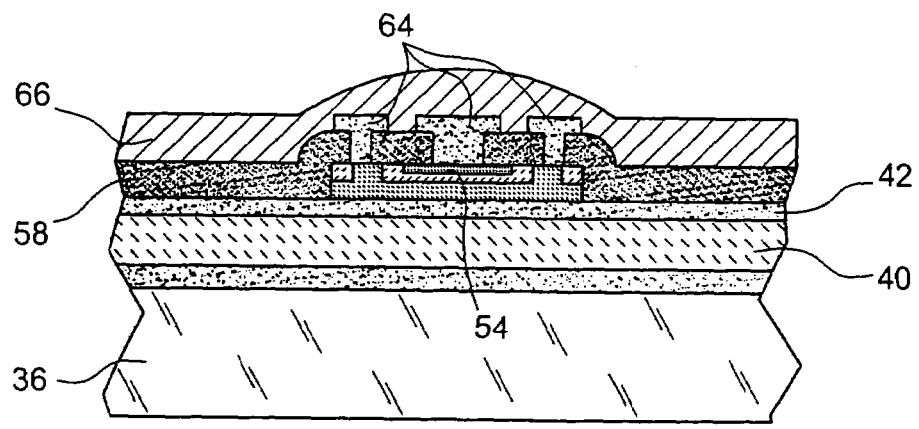

As shown in FIG. 5F, the next step is to deposit a layer 66 made of a reflecting material on the structure obtained, for example a 400 nm thick gold layer.

This layer will be used for the formation of the bolometer antenna.

Figure 5G:
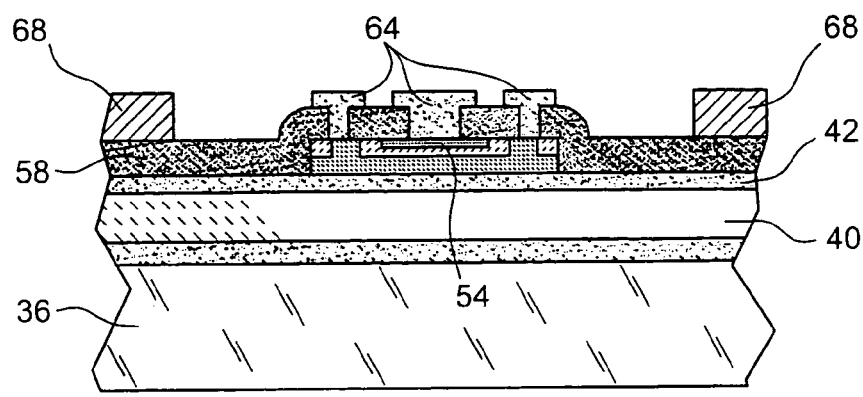

The next step is to etch the metal from which this antenna is made as shown in FIG. 5G. Thus, the antenna 68 above the layer 60 is obtained.

Figure 5H:
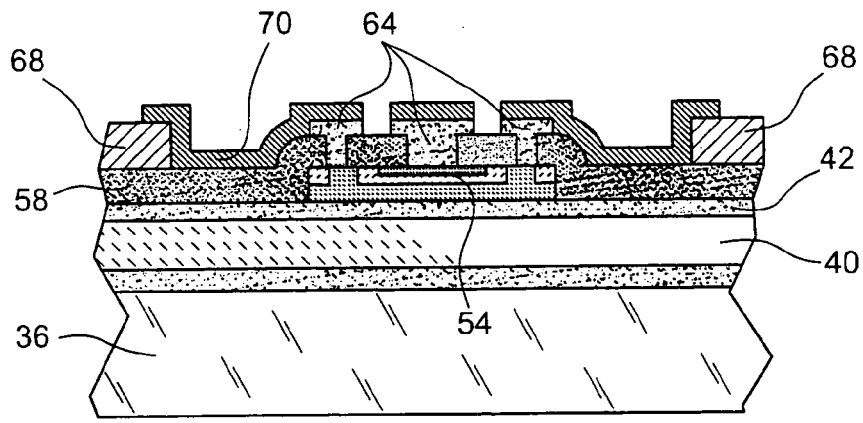

Then as shown in FIG. 5H, the next step is to deposit a layer of TaN or TiN, for example 90 nm thick, and the layer thus deposited is then etched to form the arms 70 of the bolometer used to support the central thermometer of this bolometer.

Figure 5I:
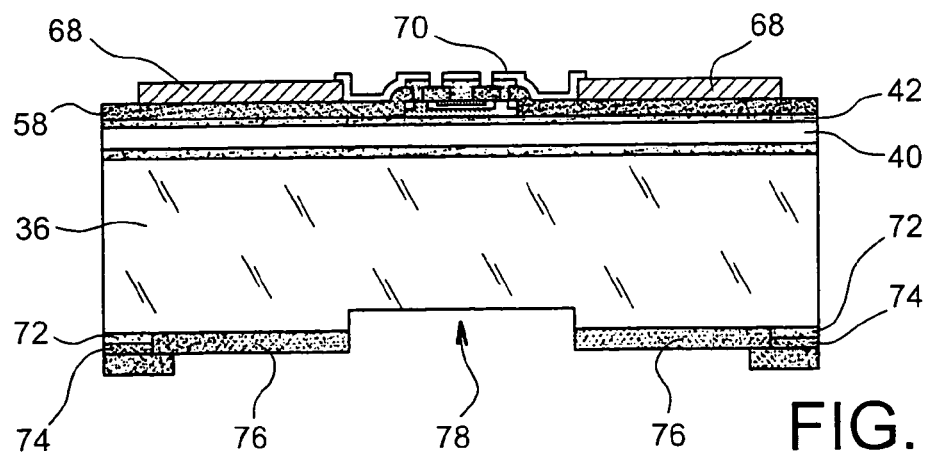

The next step is to treat the back face of the bulk silicon substrate 36 so as to obtain the structure seen in FIG. 5I, by means of a series of deposits and etchings.

On the back face of the substrate, at its two ends, there remains a narrow TEOS silica layer 72 (for example 1 µm thick and 50 nm wide). On this layer, there also remains an oxide layer 74 obtained by PECVD, for example 2 µm thick with the same width as layer 72.

As can be seen, there is a layer of photosensitive resin 76 remaining on both sides of the substrate 36, for example a 7 µm thick layer of 5740 resin extending on both sides of the substrate covering the narrow layers 72 and 74, while leaving a central part 78 of the substrate 36 that was etched over a small thickness, for example of the order of 5 µm.

Figure 5J:
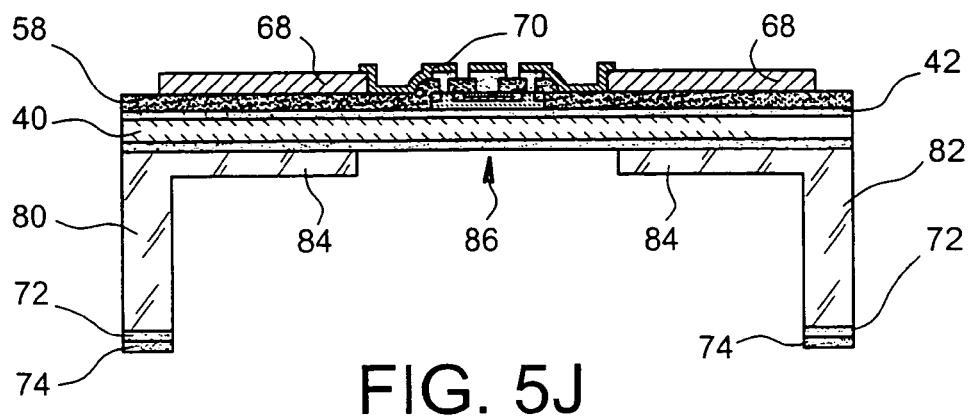

Then, as shown in FIG. 5J, a second series of silicon and silica etchings is made, still through the back face of the substrate 36.

Thus, most of the substrate 36 is eliminated while leaving only the lateral parts 80 and 82 of the silicon that enable a subsequent embedment of the substrate covered by the reflecting layer. These lateral parts 80 and 82 are the same width as the layers 72 and 74 as can be seen.

Moreover, silicon parts 84 of the substrate 36 subsist in areas located under the antenna, continuously with the lateral parts 80 and 82, these thin parts 84 being of the order of 5 µm thick.

On the other hand, the silicon in the substrate 36 has completely disappeared from the zone 86 delimited by the parts 84, as can be seen in FIG. 5J, in other words under the part corresponding to the central thermometer and the associated beams or arms.

Figure 5K:
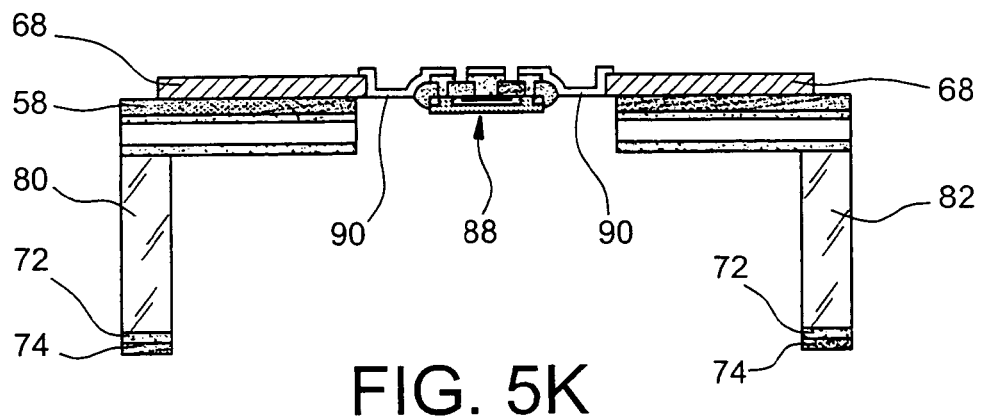

Then as shown in FIG. 5K, a third series of silicon and silica etchings is made through the back face of the structure obtained in FIG. 5J, to eliminate silicon zones 84 from this structure and to obtain the central thermometer 88 of the bolometer and the arms 90 through which this thermometer is supported by the bolometer antenna.

Figure 5L:
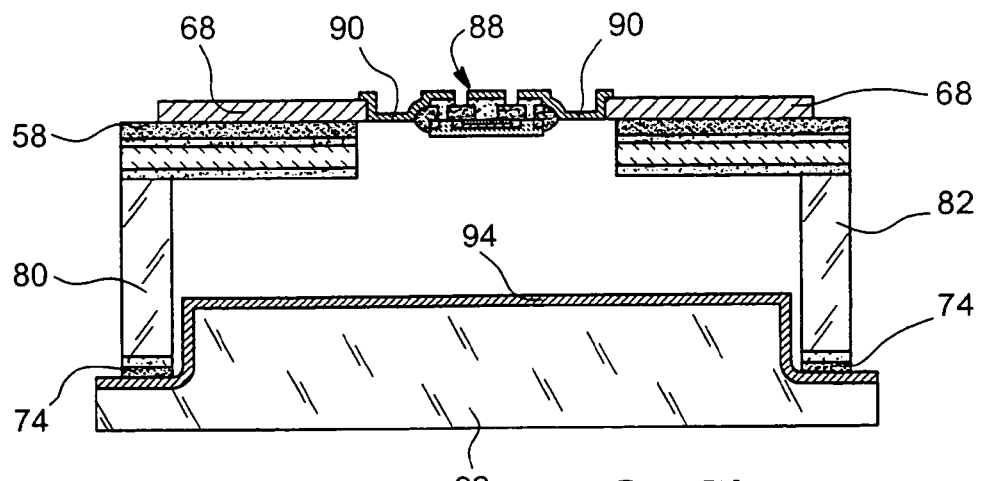

To complete formation of the bolometer, a silicon substrate 92 is made that can be embedded in the structure obtained in FIG. 5K, through the back face of this structure as shown in FIG. 5L.

Before embedding this substrate 92 into the structure, a thin electrically conducting layer 94 is deposited on the face of the substrate that will be used for embedment, for example a 400 nm thick gold layer.

As shown in FIG. 5L, the next step is to embed the substrate 92 thus made reflecting, into the structure of FIG. 5K, the embedment depth being adjusted as a function of the thickness chosen for the resonant cavity of the bolometer.

In a bolometric device conforming with the invention, the quadrupole antenna may be replaced by any other antenna compatible with such a device, for example a spiral antenna.

Figure 6:
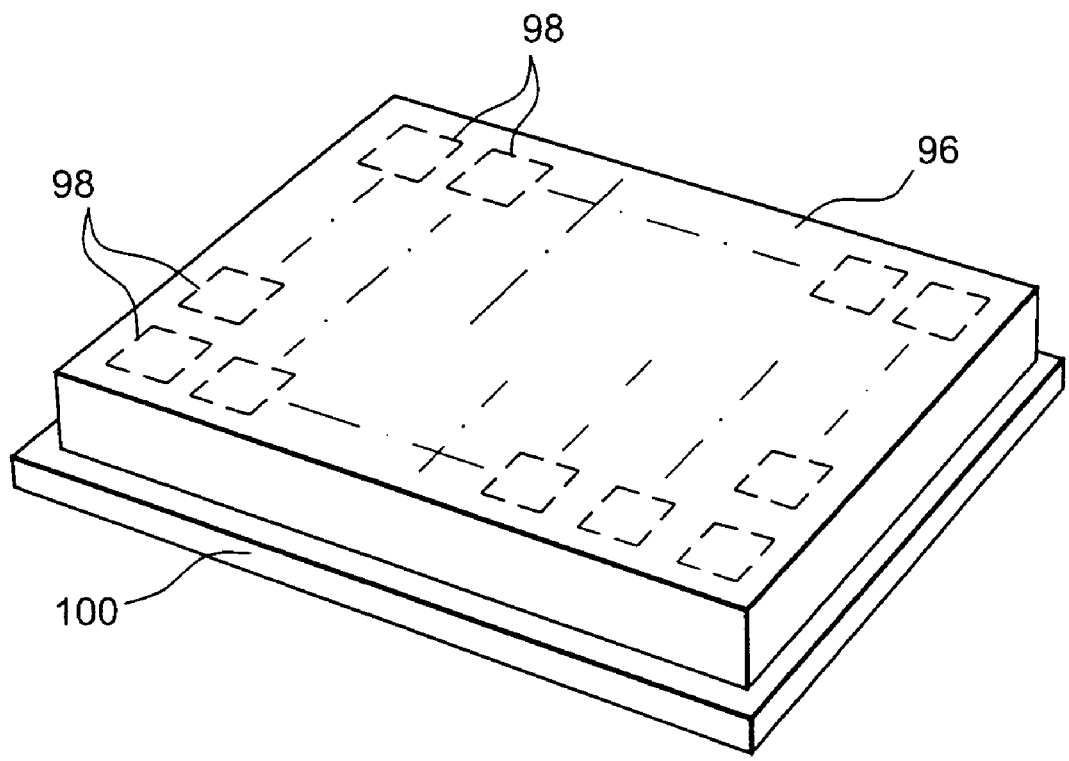

Moreover, the examples of the device that have been given up to now only include one bolometer. However in practice, a matrix 96 of such bolometers is used as shown diagrammatically in FIG. 6.

The bolometers 98 in this matrix 96 are formed from a single substrate DSOI, on which electrical insulations (not shown) are provided as necessary for bolometers.

Moreover, a reflecting substrate 100 is provided for collective embedment in detection parts (not shown) of bolometers 98.

What is claimed is:

1. A device for bolometric detection of millimetric or sub-millimetric electromagnetic waves, this device comprising at least one bolometer comprising a receiving antenna (22, 68), a resistive load (26, 90), a thermometric element (24, 88) and a resonant cavity (28), surrounded by a part of the bolometer, this part being made from a material with optical index n, the receiving antenna being located above the resonant cavity, this device being characterized in that the thickness of the resonant cavity is strictly less than $\lambda/(4n)$, where $\lambda$ is the average wavelength of the electromagnetic waves to be detected by the device.

2. The device according to claim 1, in which the bolometer also comprises a detection part (18) that comprises the receiving antenna (22) and the thermometric element (24), and a reflecting substrate (16, 92) embedded in this detection part, the resonant cavity being delimited by this reflecting substrate and this detection part.

3. The device according to claim 1, in which the receiving antenna is a quadrupole antenna (22, 68).

4. The device according to claim 1, in which the bolometer is of the cooled type.

5. The device according to claim 1, in which the bolometer is of the uncooled type.

6. The device according to claim 1, comprising a matrix (96) of M×N bolometers, where M and N are integers equal to at least 1.

7. A process for manufacturing the device according to claim 1, in which the bolometer comprising the receiving antenna (68), the resistive load (90), the thermometric element (88) and the resonant cavity is formed from a substrate (34) comprising a bulk silicon/silica/thin silicon layer structure.

8. The device according to claim 7, in which the substrate (34) comprises a bulk silicon/silica/thin silicon layer/silica/thin silicon layer structure.

* * * * *